April 25, 1967  F. SASSAK  3,315,516
FLEXIBLE MANDRIL FOR PIPE OR TUBE BENDING
Filed Dec. 15, 1964  3 Sheets-Sheet 2

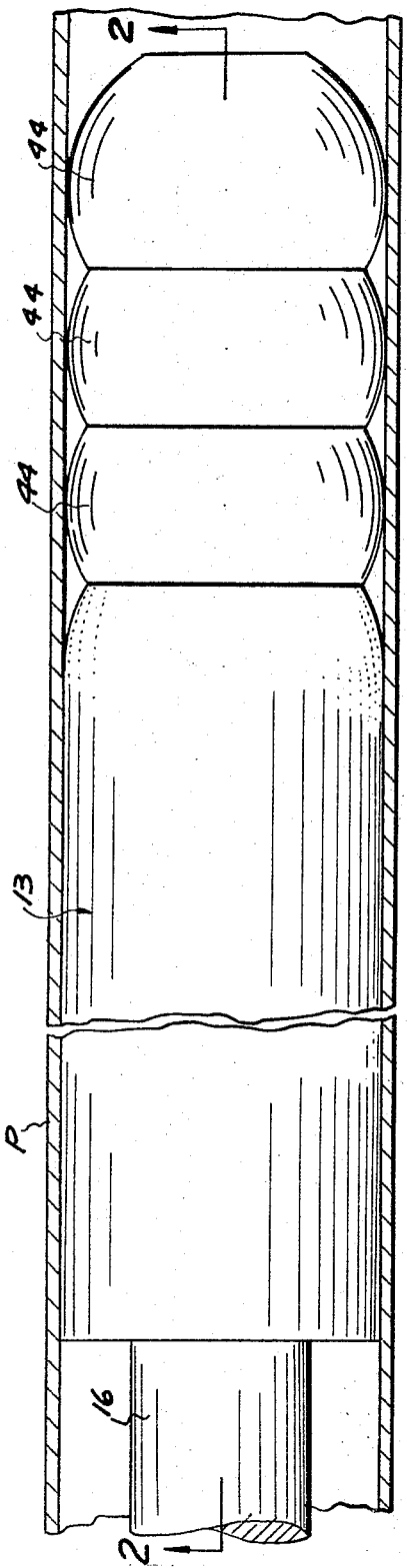

INVENTOR
FRANK SASSAK
BY Cullen, Sloman & Cantor
ATTORNEYS

April 25, 1967   F. SASSAK   3,315,516
FLEXIBLE MANDRIL FOR PIPE OR TUBE BENDING
Filed Dec. 15, 1964   3 Sheets-Sheet 3
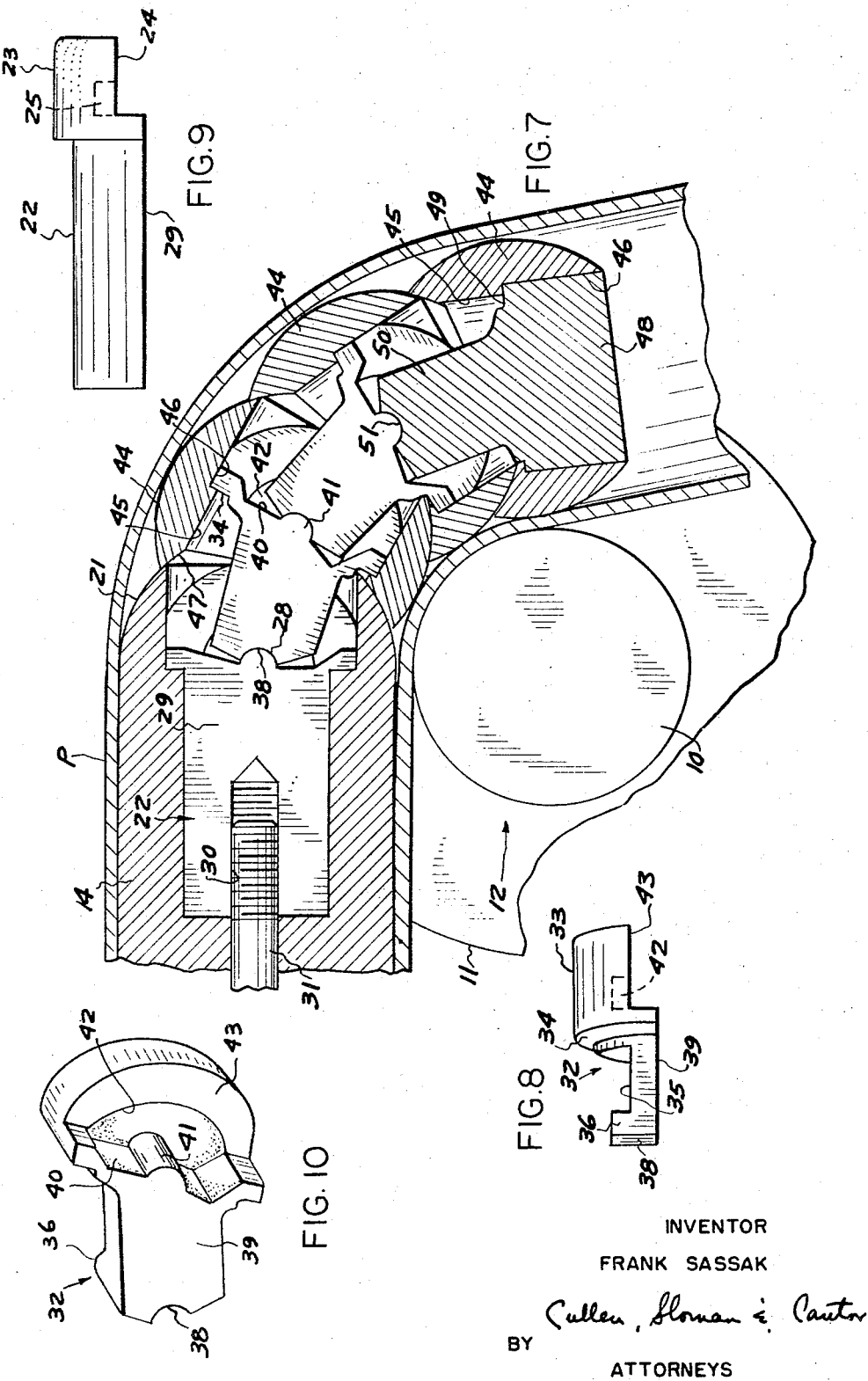
INVENTOR
FRANK SASSAK
BY Cullen, Sloman & Cantor
ATTORNEYS United States Patent Office 3,315,516
Patented Apr. 25, 1967

3,315,516
FLEXIBLE MANDRIL FOR PIPE OR
TUBE BENDING
Frank Sassak, Dearborn, Mich.
(1033 Vermont Ave., Detroit, Mich. 48216)
Filed Dec. 15, 1964, Ser. No. 418,457
5 Claims. (Cl. 72—466)

ABSTRACT OF THE DISCLOSURE

The present invention relates to a flexible mandril for bending pipes and tubes which includes a stationary head of cylindrical form, spherically shaped at one end, and flexibly connected thereto a series of contacting overlapping spheres of the same radius all adapted to fit slidably and snugly within a tube to be bent, together with a novel easily assembled flexible linkage connection between said head and spheres respectively.

The present invention relates to pipe and tube bending apparatus and more particularly to a flexible mandril usable therewith and positionable within a pipe or tube to prevent buckling.

Heretofore, various means have been employed in bending tubes to maintain a constant internal diameter and prevent buckling during bending. These have been complicated, costly and ineffective.

It is an object of the present invention to provide a flexible mandril which is positionable within a tube or pipe to be bent and which includes a series of spherically shaped elements flexibly interconnected and cooperable with each other and with the walls of the tube during bending to prevent buckling.

These and other objects will be seen from the following specification and claims in conjunction with the appended drawings in which:

FIG. 1 is a fragmentary side elevational partly sectioned view of the present mandril positioned within a straight pipe or tube to be bent.

FIG. 2 is a fragmentary section taken in the direction of arrows 2—2 of FIG. 1.

FIG. 7 illustrates the positioning of the flexible mandril within the pipe during bending.

FIG. 8 is a plan view of one of a pair of symmetrical link elements.

FIG. 9 is a plan view of one of a pair of symmetrical link elements anchored within the mandril head.

FIG. 10 is a side perspective view of the link element of FIG. 8.

Figure 3:
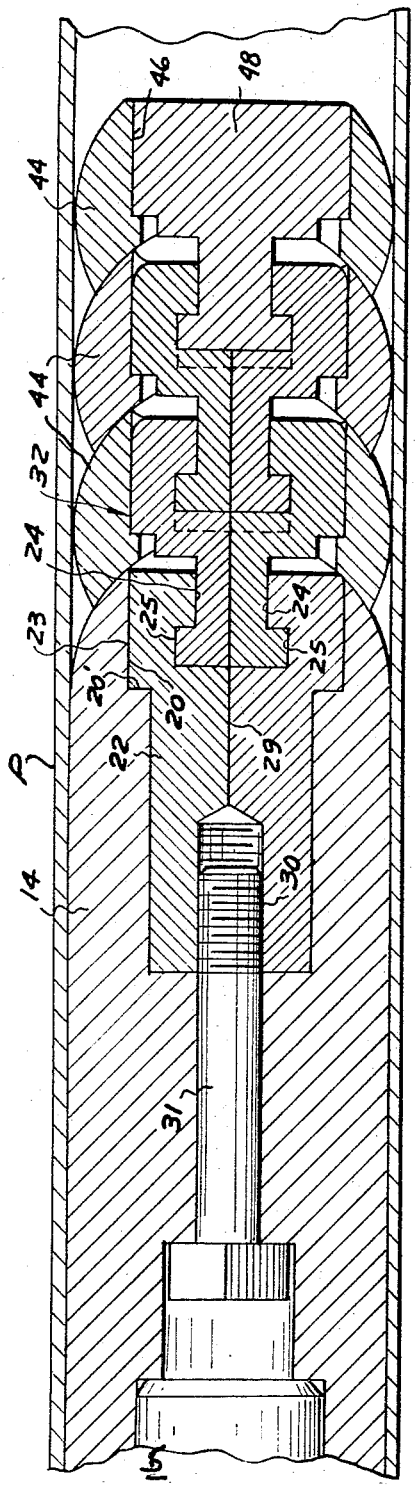
FIG. 3 is a fragmentary section taken in the direction of arrows 3—3 of FIG. 2.

It will be understood that the above drawings illustrate merely one preferred embodiment of the invention, and that other embodiments are contemplated within the scope of the claims hereafter set forth.

Referring to the drawing in all views, the pipe or tube to be bent is designated by the letter P. In conventional pipe or tube bending apparatus there is normally a supporting wheel assembly 11 including an annular groove 12 corresponding substantially to the diameter of the tube to be bent, providing a central hub 10 around which the pipe is bent as illustrated in FIG. 7.

The present flexible mandril positionable within pipe or tube P to prevent buckling during bending is generally indicated at 13, FIG. 1. Said mandril includes a stationary cylindrical head 14 snugly and slidably positionable within tube P rearwardly of the portion to be bent, FIG. 7, and includes bore 15 which receives one end of elongated locator rod 16 secured thereto by transverse pin 17, FIG. 2. Bore 15 terminates in bore 18 of reduced diameter. The inner end of head 14 includes a bore 19 and counterbore 20 of increased diameter defining stop shoulder 20' therebetween. The inner end 21 of head 14 is spherically shaped.

The mandril includes a series of contacting and overlapping spheres 44 of the same radius as the internal radius of the tube and corresponding to the radius of spherical end 21 of the head. These spheres are connected flexibly to each other in a line, with the inner of said spheres receiving and flexibly connected to the spherical end portion 21 of head 14.

Each sphere 44 has a bore 45 which terminates in an outwardly opening spherically shaped surface 47, FIG. 7, of the same radius to cooperatively and guidably receive the spherical end 21 of the head and the series of spheres 44 respectively.

The present invention is particularly directed to the means by which the individual spheres 44 are flexibly connected to each other and to the spherical end portion of head 14, in overlapping engagement.

There are provided a series of links 32, each link except the outermost link 48 consisting of a pair of symmetrical link elements or keys, FIGS. 8, 9, and 10. The innermost link, includes a pair of symmetrical keys 22, FIG. 3. Each, at one end, has an arcuate head 23 of increased diameter to nest within counterbore 20 of head 14 and against shoulder 20'. Each key has at one end an inner offset face 24 which has an interior undercut laterally extending groove 25. Groove 25 is arcuate in elevation similar to groove 42, FIG. 10.

The adjacent end of element 22 is arcuate as at 27, FIG. 2.

Each link element 22 adjacent wall 24 has a transverse end face 26, FIG. 2, which includes transversely extending ridge 28 of arcuate cross-section. Ridge 28 acts as a bearing surface for one end of the adjacent link 32.

Link elements 22 have internal opposed flat surfaces 29, FIGS. 3, 7 and 9. When a pair of keys which define link elements 22 are assembled in face-to-face relation there is defined an axial internally threaded bore 30 to receive headed bolt 31. The latter is anchored in bore 18 of head 14 and threadably engages assembled link 22 and anchors said link within head 14.

Figure 11:
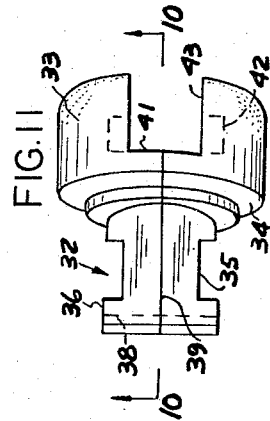
FIG. 11 is a plan view of a pair of assembled link elements corresponding to FIG. 8.
Figure 5:
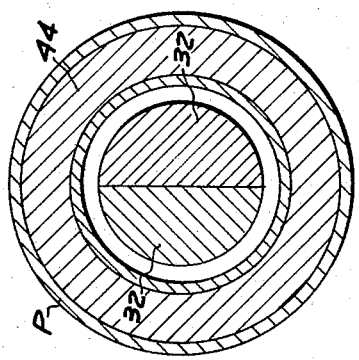
FIG. 5 is a transverse section taken in the direction of arrows 5—5 of FIG. 2.
Figure 4:
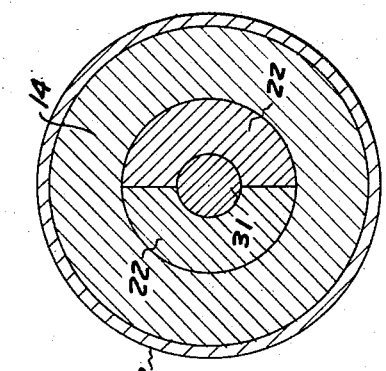
FIG. 4 is a transverse section taken in the direction of arrows 4—4 of FIG. 2.
Figure 12:
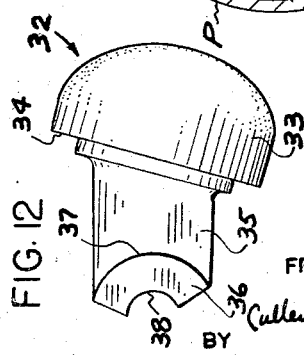
FIG. 12 is a side elevational view thereof.

Each of the successive links 32 and 48 are flexibly connected to link 22. FIGS. 10, 11 and 12, show the configuration of links 32. The outermost link 48 is not split like the others.

Links 32 are defined by a pair of opposed symmetrical keys each of which has a semi-cylindrically shaped enlarged end portion 33 and a transverse inner end face defining shoulder 34 for cooperative registry within and against the shoulder defined by counterbores 46 within the spheres 44.

Each of the link elements 32 includes an elongated narrow shank 35 which terminates at one end in the transverse laterally extending boss 36. Boss 36 has an arcuate bearing surface 37, FIG. 12, adapted for cooperative registry within the corresponding arcuate undercut recess 25 within link 22, FIGS. 2 and 3. The forward portion of link elements 32 include the transverse groove 38, FIG. 10, arcuate in cross-section corresponding to ridge 28, FIGS. 2 and 7, and is adapted for engaging registry therewith along with the opposed mating link element 32, FIG. 11.

The inner surface of each link element 32 is flat at 39 for cooperative engaging registry with each other, FIG. 3. Flat surface 39 terminates in a transverse end face 40 which includes the transversely extending ridge 41 of arcuate cross-section. At the inner end of ridge 41 there is formed within the inner face 43 an arcuate recess 42. Recess 42 is adapted to cooperatively receive the corresponding laterally extending arcuate boss 36-37 of a succeeding link 32 in interlocked relation.

Shank 35 is off 15 degrees approximately from the normal to face 34, FIG. 12.

Thus, links 32 when assembled together, FIG. 11, are nested within and retained against the internal shoulder of sphere 44 in an assembly by which the spheres are flexibly and cooperatively assembled in cooperative engaging registry. The spherical surface portion of one sphere or spherical end of head 14 cooperatively registers with a spherical recessed portion of an adjacent sphere. The spheres move within and relatively to each other to provide relatively close spacing of the spheres and cooperative supporting and bearing engagement against the internal surface of the tube being bent, to prevent buckling during bending, FIG. 7.

Figure 6:
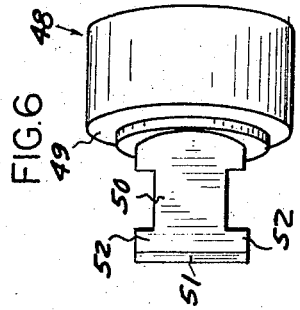
FIG. 6 is a plan view of the outermost link shown in FIG. 2.

The outermost link 48, FIGS. 6 and 7, is a unitary link and includes an annular enlarged end portion which nests within counterbore 46 of outer sphere 44, FIG. 7. Its transverse end face 49 is adapted for retaining registry with the shoulder within the outermost sphere defined by bore 45 and counterbore 46. Link 48 terminates in the elongated shank 50 which projects into the slot in between faces 43, FIG. 11, in the opposed pair of link elements 32. Shank 50 is at an angle of approximately 15 degrees from the link axis, and terminates in the laterally extending bosses 52. These are transversely arcuate and are of a shape similar to bosses 36-37, FIG. 12, for cooperative nesting within the opposed undercut arcuate recesses 42 within the forwardly arranged pair of link elements 32.

The shank 50 terminates in the transverse bearing groove 51 which is of arcuate cross-section and is adapted for cooperative bearing registry against the transverse ridges 41 on the intermediate end faces 40 of the pair of opposed link elements 32.

The axes of the respective ridges 28 are generally parallel to the axis of the supporting hub 10 of members 11-12 around which the pipe or tube P is bent.

Having described my invention reference should now be had to the following claims.

I claim:
1. In a pipe and tube bending apparatus, a flexible mandril positionable within a pipe or tube to prevent buckling during bending;
   a stationary head of cylindrical form snugly and slidably positionable within a tube rearwardly of the portion to be bent and including a spherically shaped inner end of a radius substantially the same as the inner radius of the tube;
   and a series of contacting and overlapping spheres of the same radius flexibly connected to each other in a line and to the inner end of said head respectively;
   each sphere having a bore, said bore terminating in an outwardly opening spherically shaped surface of the same radius cooperatively and guidably receiving the spherical end of said head and the series of spheres successively, the flexible connection between said spheres and head including a series of links;
   said head having a bore, each of said bores terminating in a counterbore defining a stop shoulder;
   and said links extending into said bores;
   an enlarged annular flange at one end of each link retainingly engaging said stop shoulders respectively;
   opposed laterally extending arcuate bosses at the other end of each link, except the first link, nested and retained within opposed arcuate undercut recesses formed in the one ends of adjacent links;
   and means securing the first link within said head.
2. In the mandril for tube bending of claim 1,
   each of said links except the outermost link having adjacent its one end a transverse ridge of arcuate cross-section;
   each link at its forward end except the first link having a transversely grooved portion of the same shape in cooperative engaging relation with said ridges respectively.
3. In the mandril for tube bending of claim 1,
   each link being longitudinally split defining a pair of opposed symmetrical link elements.
4. In the mandril for tube bending of claim 1,
   each of said links except the outermost link having adjacent its one end a transverse bearing ridge of arcuate cross-section;
   each link at its forward end except the first link head having a transversely groove portion of the same shape in cooperative engaging relation with said ridges respectively;
   and a locator rod of reduced diameter relative to said head projecting axially thereinto and secured thereto.
5. In the pipe bending apparatus of claim 1, the annular flange of each link terminating in a shank from which said bosses project, each shank extending from its flange approximately 15 degrees angularly of its axis.

References Cited by the Examiner

UNITED STATES PATENTS

| | | | |
|---|---|---|---|
| 1,075,045 | 10/1913 | Lewis | 72—466 |
| 1,683,573 | 9/1928 | Mueller et al. | 72—466 |
| 3,190,106 | 6/1965 | Spates | 72—466 |

CHARLES W. LANHAM, *Primary Examiner.*

L. A. LARSON, *Assistant Examiner.*